United States Patent [19]

Bournier

[11] Patent Number: 4,557,937
[45] Date of Patent: Dec. 10, 1985

[54] METHOD FOR BLANCHING MUSHROOMS AND OTHER VEGETABLES

[75] Inventor: Edgard Bournier, Fleury sur Andelle, France

[73] Assignee: M. Mario Spinoglio, Peronne, France

[21] Appl. No.: 504,045

[22] PCT Filed: Sep. 10, 1982

[86] PCT No.: PCT/FR82/00149
§ 371 Date: May 11, 1983
§ 102(e) Date: May 11, 1983

[87] PCT Pub. No.: WO83/00801
PCT Pub. Date: Mar. 17, 1983

[30] Foreign Application Priority Data

Sep. 11, 1981 [FR] France .................................. 81 17250

[51] Int. Cl.$^4$ ........................... A23B 7/06; A23B 7/148
[52] U.S. Cl. ..................................... 426/241; 426/281; 426/302; 426/615
[58] Field of Search ............... 426/615, 302, 241, 281, 426/524, 509

[56] References Cited

U.S. PATENT DOCUMENTS 3,476,078  11/1969  King ....................................... 118/30
3,843,810  10/1974  Fehmerling ........................... 426/615
4,143,167   3/1979  Blanchaud et al. ................... 426/302

FOREIGN PATENT DOCUMENTS 0021629  6/1980  European Pat. Off. .
45-19619  7/1970  Japan ................................... 426/241

Primary Examiner—George Yeung
Attorney, Agent, or Firm—Brumbaugh, Graves, Donohue & Raymond

[57] ABSTRACT

An improved method for blanching mushrooms and other vegetables which includes a vacuum impregnation stage in one or more steps and a coagulation-blanching stage. The thermal steps of the coagulation-blanching can be performed under an overpressure of 2-15 bars. Qualitative and quantitative improvement of the product are obtained in accordance with the method.

6 Claims, No Drawings

METHOD FOR BLANCHING MUSHROOMS AND OTHER VEGETABLES

The present invention relates to a method for blanching mushrooms and other vegetables while improving the characteristics of quality and quantity of the resulting product, particularly for subsequent deep-freezing or preserving.

The food products which can be treated according to the invention are for example cultivated mushrooms, woodland mushrooms such as chanterelles, ceps or morels, other cultivated mushrooms such as pleurotus and eudelis, as well as other vegetables such as asparagus, artichokes, salsify, carrots, green beans, dry beans, peas, celery, chicories, and various cabbages.

The products should, advantageously be cooled, between 0° and 2° C. and should not be allowed to warm up while being cleaned. Advantageously, washing will be effected in iced water. Said washing will be advantageously effected so as to reduce washing water absorption to a minimum for example: by spraying under pressure after dry-cleaning on a vibratory table with ventilation, the object of this being to reduce washing time.

After cleaning, trimming and in some cases grading and sorting according to quality, the products are subjected to an additional cooling to a temperature just above their freezing temperature. The product is thereafter introduced into an enclosure where a high vacuum is created, around 1 to 5 mm.Hg, while preserving the previous temperature, i.e. freezing temperature limit.

Then the product is impregnated with an impregnation liquid which is itself cooled to the adequate temperature (so that there is no evaporation at the considered pressure). Said impregnation is obtained by immersion into said liquid and by breaking the vacuum, this last operation causing the impregnation proper. Both these operations are described hereinafter in detail.

The food product is immersed under vacuum in the cooled impregnation liquid containing a coagulant product. Advantageously, said coagulant product may be egg white. The coagulant product concentration is between about 4 and 25% by weight of dry material with respect to the impregnation liquid, preferably between 6 and 12%.

After said immersion, it is possible to proceed to either a single impregnation, to a partial impregnation, or to multiple impregnations.

Single impregnation is obtained by raising the pressure once to the atmospheric pressure or to a higher pressure (2–10 bars), this aiding and increasing the impregnation rate especially for vegetables such as carrots and salsify.

Partial or multiple impregnations can also be advantageously conducted.

Such are achieved by maintaining the high vacuum inside the enclosure containing the food product and conducting the immersion in a first treatment liquid with a high concentration of coagulant, for example between 10 and 25% by weight of dry material. The coagulant may be egg white.

The pressure is then raised to an intermediate value, for example 500 mbars, causing a first impregnation by the liquid with the high concentration of coagulant. The treatment liquid is removed under this intermediate pressure, towards a receiving enclosure which is also at the same pressure. Therefore, what is left in the said first enclosure is the semi-impregnated food product, which is not surrounded with treatment liquid and which is still at the intermediate pressure, for example 500 mbars. Raising to the atmospheric pressure or to a higher pressure gives a partial impregnation, but as an alternative, a second impregnation liquid may be admitted, the coagulant concentration of which is between 0 and 4% by weight of dry material. This can be either water or a solution with a very low concentration of coagulant; it can in effect come from the residual from the first impregnation liquid adhering to the vegetables.

The pressure is then raised to the atmospheric pressure or to a higher pressure, which results in the second impregnation.

In the different stages of these multiple operations, it is possible to use either the same coagulant, or two different ones. In the first stage, the coagulant will be for example egg white, whereas in the second stage, it can be starch or protein substance of animal origin (albumin from milk, blood extracts, etc.) or of vegetable origin (for example soya protein, etc.).

As a variant, it is, for example, possible to make a first impregnation at an intermediate pressure (such as 500 mbars) using albumin as coagulant, and then a second impregnation at a pressure equal to or greater than atmospheric pressure, using another less expensive protein.

As another variant, a first impregnation can be made at an intermediate pressure (for example 500 mbars) using egg white as coagulant, and then a second impregnation at an intermediate pressure (for example 750 mbars) using another coagulant, and finally a last impregnation with water at the atmospheric pressure or at a higher pressure.

With regard to the impregnation liquid, it will be noted that it is advantageous to proceed to a salt curing whereby sodium chloride represents between 2 and 10% by weight of the liquid. This presents two major advantages: first it affords the possibility of using the liquid at a temperature below 0° C., thus preventing any vaporization and therefore any raise in the pressure; furthermore, this curing reduces considerably (reduction which can reach 40% by weight), the quantity of liquid absorbed. Where permitted by law, the impregnations can contain adjuvants, and in particular polyphosphates, citrates, sodium carbonates, and/or potash, which adjuvants have been found to have an advantageous action on the hydration of vegetables with a high content of nitrogen substances such as mushrooms for example.

After this impregnating treatment, whether by single impregnation or by multiple impregnations, the resulting impregnated food product has to be further treated by different processes before it reaches the final preserving condition. These methods will be the blanching-coagulation described hereinafter in detail.

However, between the impregnation and the subsequent methods, the "root" type food products such as salsify and carrots, and especially salsify, can be subjected to a further special treatment. It is indeed known that these vegetables all have to be peeled first, for example with steam or soda. The peeling in the conventional processes, leads to a considerable loss of weight. It has been found according to the invention that, on the one hand, it was even possible not to use any coagulant in the impregnation operation, although the results are less satisfactory, but most of all that the disadvantages of the peeling could be surprisingly reduced. To do this, the vegetables in question, and in particular salsify, which immediately after the impregnation operation, are still at a very low temperature, which is just above the freezing temperature of the vegetables, undergo an extra cooling until they are deep-frozen. It has been noted that the subsequently conducted peeling causes a smaller loss of weight and less deterioration of the vegetable structure, the improvement of which is due to the method according to the invention.

It has also been noted that these advantages were being preserved until the final product is obtained.

As a variant, it is also possible to carry out the impregnation operation under ultrasounds. Good results have been obtained, in particular with mushrooms, at frequencies around 50 hHz.

This is so whether the impregnation liquid is water or whether it contains any ingredient of the type described hereinabove.

It has been noted that, when using an ingredient such as starch for example, sedimentation was prevented, but also that in all cases, impregnation was greatly helped and that said impregnation was on the other hand more homogeneous.

After the impregnation operation, it is further possible to keep the vegetables under ultrasounds while the vegetables are still immersed in the impregnation liquid. Thus, the hydration reaction is considerably speeded up and degradations of the enzymatic type (development of stains, etc.) are avoided.

It is very advantageous to store the immersed vegetables, in particular mushrooms and roots such as salsify, under ultrasounds between the impregnation operation and the coagulation-blanching. A better outgassing is then obtained, as well as an homogenization of the treatment liquid and an improvement of the speed and regularity of impregnation. The hydrolysis reactions are also speeded up. The storage time can thus be reduced with respect to the durations obtained without ultrasounds. For example, under ultrasounds, the storage time can be 1 to 3 h only at 20° C. or 24 h at 0°/+5° C.

It is thus possible to prevent bacterial or enzymatic evolution which would lower the quality and which must be fought with $SO_2$ in sodium bisulfite form, while improving the yield.

The coagulation-blanching processes mentioned hereinabove will now be described.

The food products which have undergone impregnation and in some cases the extra treatment described hereinabove for salsify and carrots for example, should be subjected to a coagulation-blanching treatment. Said heat treatment is preferably conducted, according to the invention, in two stages:

(a) first a treatment at high temperature is effected, which treatment leads to a very rapid superficial coagulation due to the thermal shock suffered by the vegetable. The treatment period is between a few seconds and one minute and the operation takes place for example by immersion in oil at around 130° C. for about 20 secs., or in brine, saturated under boil, for about 30 secs., or in water over-heated to 130° C. (this implying a slight overpressure) for about 20 secs., or else in a hot gas such as air or nitrogen heated to a comparable temperature. In this last case, a superficial drying occurs, which aids the retention of the juices owing to the formation of a superficial film;

(b) then a deep-coagulation is conducted, accompanied by the blanching phenomenon by continuing the heat treatment at a lower temperature of between 65° and 90° C., for 8 to 10 mins.

As a variant, it is also possible to cause superficial coagulation by different means, some of which do not involve heat:

(1) it is possible to use an infra-red treatment which causes a superficial coagulation (which treatment can also be followed by a micro-wave treatment causing deep coagulation).

(2) it is possible to produce an enzymatic coagulation in particular if the superficial coagulant is a milk derivative (the enzyme can in this case be of the rennet type; and also in this case if the enzymatic treatment is extended, deep coagulation can be reached by a propagation phenomenon);

(3) it is likewise possible to cause superficial coagulation by soaking in an acid bath (acetic acid, citric acid, hydrochloric acid, etc., of pH less than 3), the treatment lasting between a few seconds and one minute, depending on the treating agent used; this treatment can also be followed optionally with a microwave treatment leading to a deep coagulation.

In all the aforesaid cases, i.e. regardless of the method used, and whatever the stage at which the operation has stopped (superficial or deep coagulation) said operations are normally followed by a conventional blanching of 8 to 10 mins. at a temperature of about 65° to 90° C. For certain vegetables such as carrots, salsify, green beans, peas, blanching can be reduced or even omitted altogether. In the case where these vegetables are packed with a sauce, then the blanching can be omitted, this simplifying matters and improving the product by recovering any juices exuding from the vegetables.

Whatever the coagulation-blanching techniques used amongst the different variants mentioned hereinabove, the food product so treated is thereafter subjected to either deep-freezing, or to packaging followed by conventional sterilizing or pasteurizing, with subsequent cooling, or else to other preserving processes such as for example with ionizing radiations.

In all the cases, a considerable improvement is noted both on the level of the quantity (reduced loss of weight) and on the level of the quality (less loss of aroma and of effective substances).

As a preferred variant of the coagulation-blanching operations conducted after the impregnation methods in vacuum at low temperature, it is indicated that all the thermal operations will be very advantageously conducted at an overpressure of between about 2 and 15 bars.

Reverting to the different possible processes of coagulation-blanching described hereinabove, the hot coagulations and subsequent blanching are therefore conducted under pressure, as well as the cooling following the blanching.

One of the ways to proceed can be as follows: the vegetables to be treated are introduced in an enclosure which is termed a "hyperbar" and which is equipped with a heating system.

In order to obtain the pressure set for the treatment, for example 10 bars, compressed air or nitrogen is introduced.

The coagulation fluid heated beforehand to the set temperature, for example 130° C. is instantaneously introduced by gravity or by pump. The heating system of the blanching equipment keeps this temperature constant throughout the coagulation time, for example 30 secs.

Once the coagulation time has elapsed, draining is conducted by gravity or pump, and the liquid is discharged at 130° C., and right after draining, the blanching liquid, for example water at 80° C., is introduced, and said temperature is kept for example for 6 mins, after what draining is conducted still by gravity or pump, and immediately after, cold water at 15° C. for example, is introduced.

Throughout the duration of the cooling, the pressure will be kept by playing on the air pressure and on the amount of cooling water admitted and discharged. The cooling period is related to the size of the products.

It is possible to shorten the cooling period by finishing cooling with iced water.

After the cooling controlled by a thermocouple placed in the product, the water is removed and the blanching device decompressed. The vegetables are extracted from said blanching device.

In the case where coagulation by thermal shock is not necessary, the blanching liquid is immediately introduced.

Thereafter, the normal preparation before packaging is conducted (sorting out, grading, shredding, control, etc.) and the packaging proper (in tin or plastic boxes, in soft packages or metallo-plastic complex packages such as for example aluminium-polyamide) adapted to support the effects of external pressure to which it will be subjected thereafter. Indeed, the subsequent stages of sterilization (120°–150° C.) or pasteurizing (95° to 100° C.), and subsequent cooling are conducted at the same over-pressure of 2 to 15 bars. By overpressure is meant here that, for example, during sterilizing at 130° C., the normal absolute pressure is 3 bars and that consequently according to the invention the work is conducted at between 5 and 18 bars.

In this way, i.e. by working under pressure in all the thermal operations of coagulation-blanching, and sterilizing or pasteurizing, the invention leads to better results, meaning that the losses of weight through exudation are further reduced and an even more reduced passage of the effective substances into the juice is noted.

I claim:

1. A method for preserving vegetables which comprises:
   (a) cooling the vegetables to a temperature of from 0° C. to +2° C.,
   (b) washing the vegetables with iced water and trimming the vegetables;
   (c) cooling the trimmed vegetables to said temperature again,
   (d) placing the trimmed and cooled vegetables in an enclosure at said temperature in which a vacuum of from 1 to 5 mm. Hg has been created,
   (e) immersing the vegetables into at least one treatment liquid containing a coagulant at a temperature at which there is no evaporation and then increasing the pressure in one or more stages to achieve impregnation of the vegetables with the coagulant while maintaining the temperature at which no evaporation occurs, and
   (f) coagulation-blanching the vegetables.

2. A method according to claim 1 wherein the treatment liquid includes from 2 percent to 10 percent by weight of salt.

3. A method according to claim 1 wherein said coagulation-blanching is accomplished:
   (a) at a temperature which causes the vegetables to suffer thermal shock which results in superficial coagulation, and then
   (b) at a lower temperature between 65° C. and 90° C.

4. A method according to claim 1 wherein said coagulation-blanching is accomplished by:
   (a) infra-red treatment; or
   (b) soaking in an acid bath wherein the pH of said bath is less than 3; or
   (c) enzymatic coagulation;
   and said coagulation-blanching is followed by a hot blanching for 8 to 10 minutes at 65° C. to 90° C.

5. A method according to claims 1, 2, 3, or 4 wherein said coagulation-blanching is performed under an over-pressure of 2 to 15 bars.

6. A method according to claim 1 wherein said vegetables are root type food products and wherein said products are frozen prior to said coagulation-blanching and peeled after said coagulation-blanching.

* * * * *